June 25, 1935.  E. J. WITCHGER  2,005,850
ATTACHMENT FOR MEASURING TAPES
Filed Jan. 29, 1934
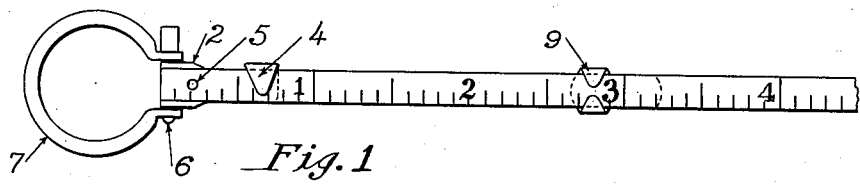
Fig. 1
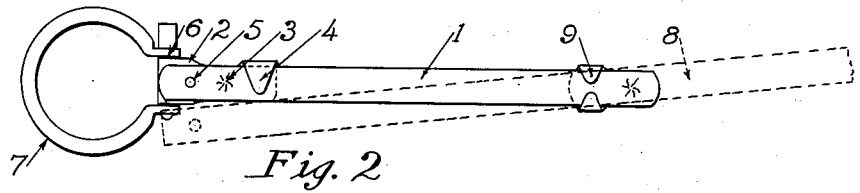
Fig. 2
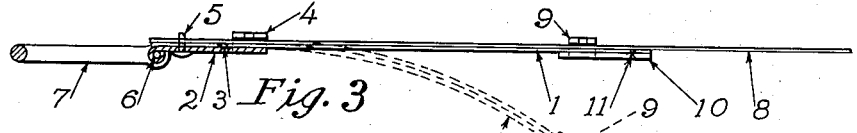
Fig. 3
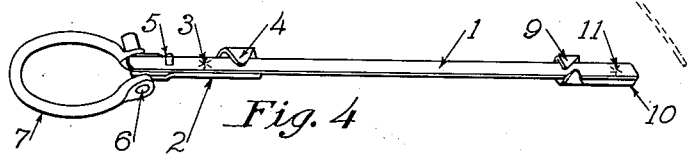
Fig. 4
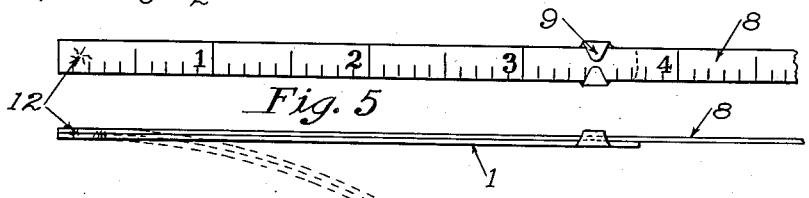
Fig. 5
Fig. 6
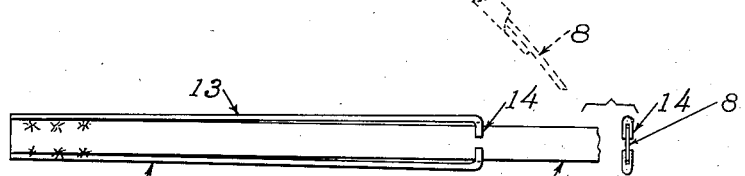
Fig. 7
Inventor
EUGENE J. WITCHGER
By George B. Willcox
Attorney Patented June 25, 1935

2,005,850

UNITED STATES PATENT OFFICE 2,005,850

ATTACHMENT FOR MEASURING TAPES

Eugene J. Witchger, Saginaw, Mich., assignor to The Lufkin Rule Company, Saginaw, Mich., a corporation of Michigan Application January 29, 1934, Serial No. 708,798

5 Claims. (Cl. 33—137)

This invention relates to metal measuring tapes, particularly surveyors' tapes, which are thin, narrow, very long and usually provided with detachable ring-handles.

Among the objects of the invention may be noted the provision of a tape-reinforcing device in the form of a flat strip of ribbon metal or its equivalent, arranged to minimize the chance of breaking the tape near its end or adjacent its handle during the ordinary use of a surveyor's tape.

For example, serious loss is often caused by breakage of tape measures wherein the tape is fastened to the flat inflexible body member of a ring-type handle. At the end of such a body member there is developed a tendency for the tape to bend sharply and sometimes break when the operator tries to whip a long length of tape into position for taking measurements. Similar tendency to break is occasioned in many other circumstances of use.

Another object is to provide an efficient resilient reinforcement member for the tape handle end, having at one end a sliding connection to the tape that will accommodate itself to the movements occasioned by the flexure of the tape, thus giving adequate support to the otherwise over stressed part of the tape near the bend; and an improved means for detachably securing the tape to the handle and to the flexible reinforcing member.

Fig. 1 is a plan view showing a preferred form of the apparatus with measuring tape attached.

Fig. 2 is a view similar to Fig. 1 showing the resilient reinforcing member applied to the ring handle, the manner of attaching the tape being indicated by dotted lines.

Fig. 3 is an edge view, partly in section, of the parts shown in Fig. 1, the flexed position of the tape and reinforcing member being indicated by dotted lines.

Fig. 4 is a perspective view of the parts shown in Fig. 2.

Fig. 5 is a plan view showing another form.

Fig. 6 is an edge view of Fig. 5, the flexed position being indicated by dotted lines.

Fig. 7 is a view similar to Fig. 5 showing a modified form of tape reinforcing member.

Similar reference characters indicate corresponding parts throughout the several views of the drawing.

Referring now more particularly to the embodiment shown in Figs. 2 and 4, there is illustrated at numeral 1 the tape reinforcing member of my invention, made of a bendable strip of resilient ribbon metal which may be a piece of tape material preferably about twenty-five per cent thicker than the tape with which it is being used. Member 1 is placed lengthwise upon the non-flexible body 2 of the usual tape handle, being fastened at 3, as by spot welding. A hook 4 on the edge of body 2 is bent to overlay the reinforcing member 1. A pin 5 projects upwardly from the face of member 1. The body 2 is hinged at 6 to a ring 7, the parts 2 and 7 constituting the usual tape handle. Reinforcing member 1 extends a substantial distance from the body 2, about two and a half inches being suitable for use with a tape a quarter of an inch wide, and is placed face-to-face against the tape 8 when in use.

A keeper 9 is located on reinforcing member 1 remote from the body 2. The keeper is in the form of a pair of opposed lugs. Their function is to keep the tape 8 and the member 1 face to face, one being slidable with respect to the other. Endwise creeping movements of the keeper 9 and member 1 relatively to the tape 8 are thus permitted while the tape and member 1 together are being bent laterally, as shown by the dotted lines, Figs. 3 and 6. Moreover, the lugs 9 of the keeper are arranged so as to permit the end of tape 8 to have limited angular or sidewise sliding movement relatively to body 2, as indicated by dotted lines, Fig. 2.

If the keeper is carried by the reinforcing member 1, as shown in Figs. 3, 4, its lugs 9 may be formed on a base 10, spot welded at 11 to member 1.

The tape is applied to the reinforcing member 1 by slipping it endwise under lugs 9 as indicated by the dotted lines, Fig. 2, then moving it angularly underneath the hook 4 and fastening it by the pin connection at 5, Fig. 3.

Whenever the tape is bent as shown in Fig. 3, or in the opposite sense, the resilient member 1 acts as a leaf spring that constitutes a flexible backing for the tape near the handle. Thus any bending action to which the tape is subjected in use must produce a long, even bend without setting up strains that might tend to weaken or break the tape.

The arching action of the tape and the member 1 causes them to slide a little endwise, one upon the other. Such sliding or creeping movement, greatest near the keeper lugs 9, permits the strip 1 to keep closely fitted to the tape, thereby effectively supporting it under all conditions of use.

Instead of welding the bendable resilient member 1 to the handle body 2 and to base 10 of lugs 9, as above described, these parts may be formed from a single piece of metal.

If, as shown in Figs. 5, 6, 7, permanent attachment of the tape to the end of reinforcing member 1 is provided, as by welding at 12, they can be pin-connected to the body 2 of a ring handle in the same manner as the tape is shown connected in Fig. 3, or the parts 8 and 12, or 8 and 13, may be used without a handle, as in Figs. 5, 6, 7. In any case the member 1 yieldingly reinforces the tape without setting up in it any endwise or buckling stresses and prevents its being sharply bent or broken.

In Fig. 7 is shown a form of the invention wherein two spring wires 13, 13 are welded to the tape at its longitudinal edges and the free ends of the wires are shaped to slidingly engage the tape at 14 to serve the same purposes as the keepers 9.

Changes could be made in carrying out the above typical constructions without departing from the scope of the invention, and it is intended that all matter contained in the above description or shown in the accompanying drawing shall be interpreted as illustrative and not in a limiting sense.

Having thus described my invention, what I claim and desire to secure by Letters Patent is:

1. The combination with a metal tape having a handle body and means detachably securing the tape thereto, a reinforcing member of bendable resilient ribbon metal fixed lengthwise to the handle body and extending from the end thereof a substantial distance and overlying the tape, a keeper slidingly connecting the tape to said resilient reinforcing member at a point remote from said handle body and arranged to permit relative endwise movements of the keeper and tape upon coincident lateral bending of the tape and reinforcing member, said detachable securing means and said keeper being arranged to permit angular sidewise sliding movement of the tape end relatively to the body.

2. The combination with a metal tape having a handle body and means detachably securing the tape thereto, a bendable reinforcing member of resilient ribbon metal fixed lengthwise to the body and extending a substantial distance from the end of the body and overlying a face of the tape, a keeper slidingly connecting the tape to the bendable reinforcing member at a point remote from said body and arranged to permit relative movements of the keeper and tape in a direction lengthwise of the tape upon coincident lateral bending of the tape and reinforcing member.

3. A measuring tape having in combination, a normally straight reinforcing member comprising a bendable strip of resilient ribbon material extending lengthwise of the tape and overlying a face thereof, an end of said resilient reinforcing member being fastened to the tape, and a keeper slidingly securing the reinforcing member to the tape so that conjoint flexing of the tape and bendable reinforcing member imparts to the portion of the tape adjacent the keeper sliding movements relative to the tape in the direction of its length.

4. A measuring tape having in combination, a resilient bendable reinforcing member extending lengthwise of the tape for a substantial distance from an end thereof, an end of said tape being fastened to an end of said reinforcing member, a keeper remote from said fastening means slidingly connecting the reinforcing member to the tape so that conjoint flexing of the tape and the bendable reinforcing member produces movements of the member and tape relatively to each other in the direction of their length at a place remote from the fastening means, a handle having a body portion and means detachably connecting the tape to said body portion.

5. A measuring tape having in combination a reinforcing member comprising a strip of bendable resilient ribbon material overlying a face of the tape and extending lengthwise thereof, a fastener releasably securing an end of said bendable reinforcing member to the tape adjacent an end thereof, and a keeper remote from said fastener and adapted to secure the other end of the bendable reinforcing member slidingly to the tape so that conjoint flexing of the tape and bendable reinforcing member imparts to the said remote portion of the keeper sliding movements relative to the tape in the direction of its length.

EUGENE J. WITCHGER.